Aug. 8, 1939.  N. D. LEVIN  2,168,622
MATERIAL HANDLING MECHANISM
Filed April 6, 1933   7 Sheets-Sheet 1
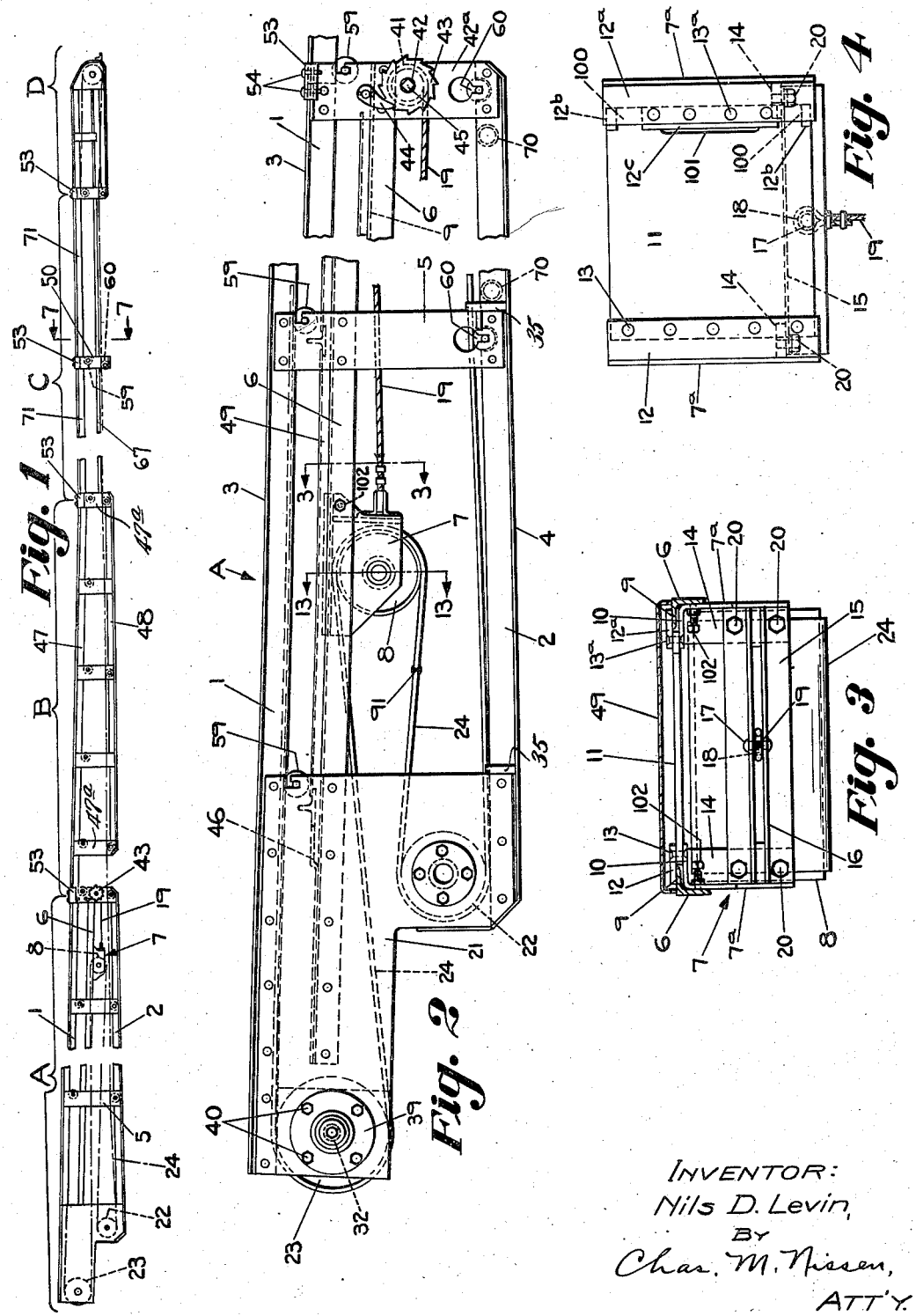
INVENTOR:
Nils D. Levin,
By
Chas. M. Nissen,
ATT'Y.

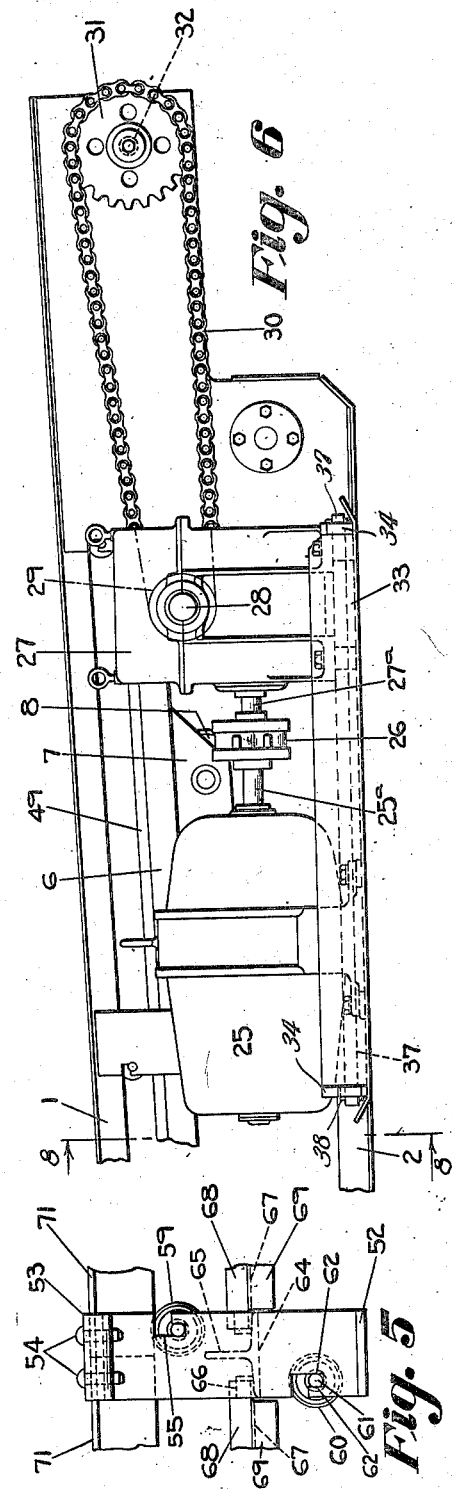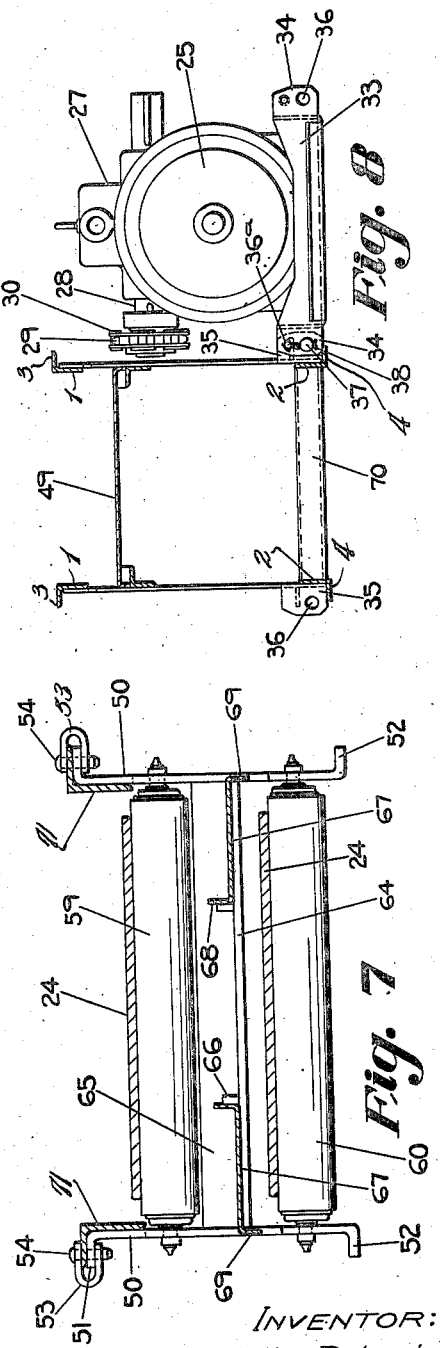

Aug. 8, 1939.　　　　N. D. LEVIN　　　　2,168,622
MATERIAL HANDLING MECHANISM
Filed April 6, 1933　　　7 Sheets-Sheet 3
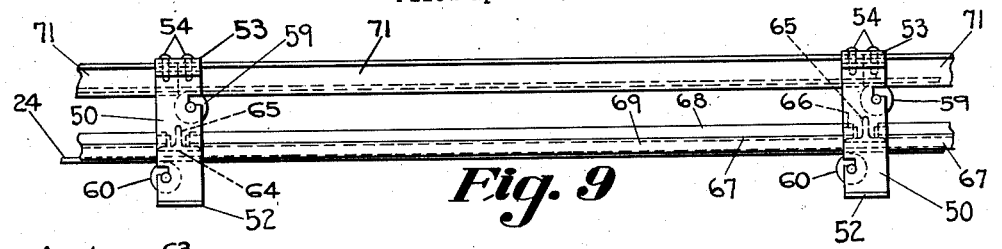
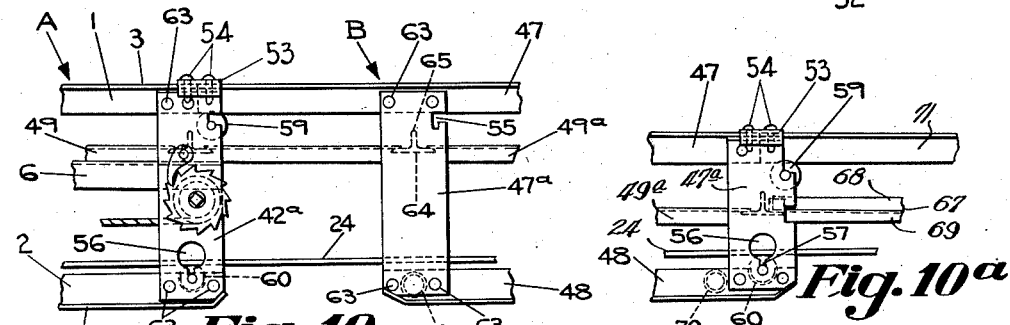
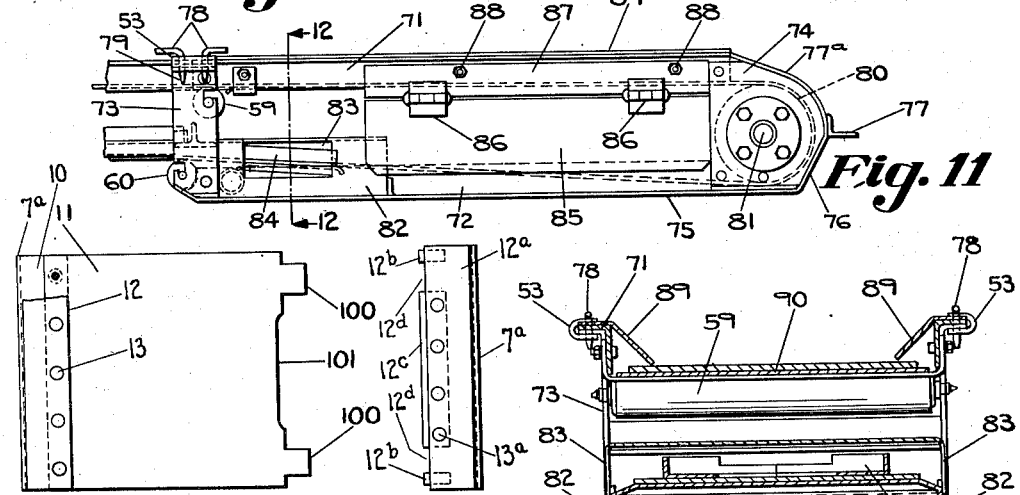
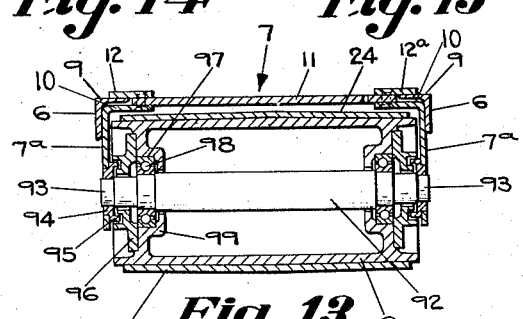
INVENTOR:
Nils D. Levin,
BY
Chas. M. Niesen,
ATT'Y.

Aug. 8, 1939.  N. D. LEVIN  2,168,622
MATERIAL HANDLING MECHANISM
Filed April 6, 1933  7 Sheets-Sheet 4
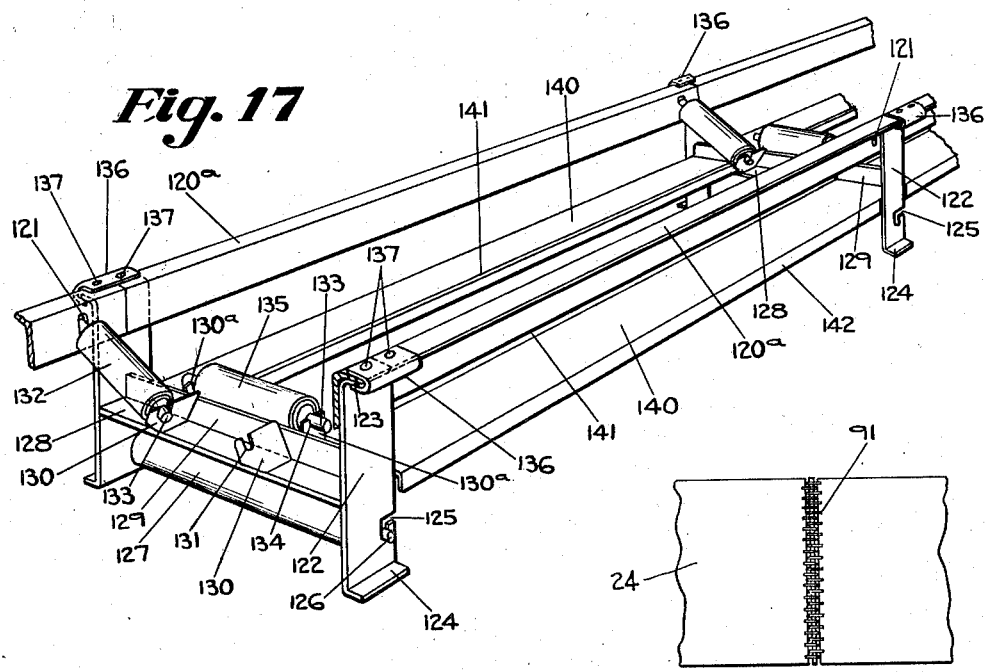
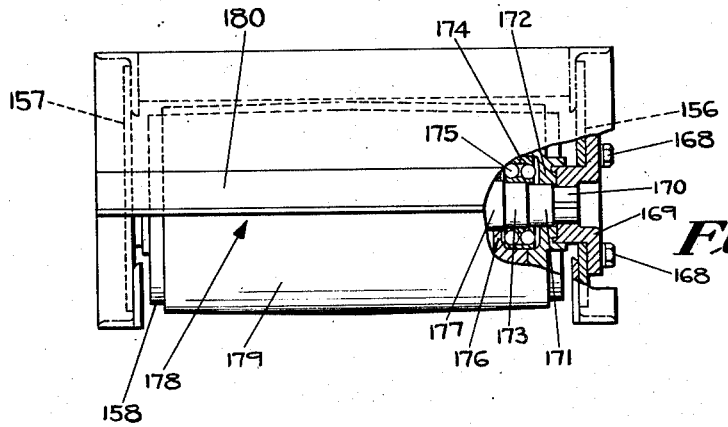
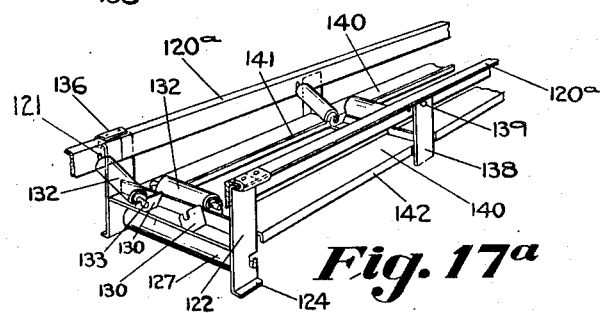
INVENTOR:
Nils D. Levin,
By
Chas. M. Nissen,
ATT'Y.

Aug. 8, 1939.  N. D. LEVIN  2,168,622
MATERIAL HANDLING MECHANISM
Filed April 6, 1933   7 Sheets-Sheet 5
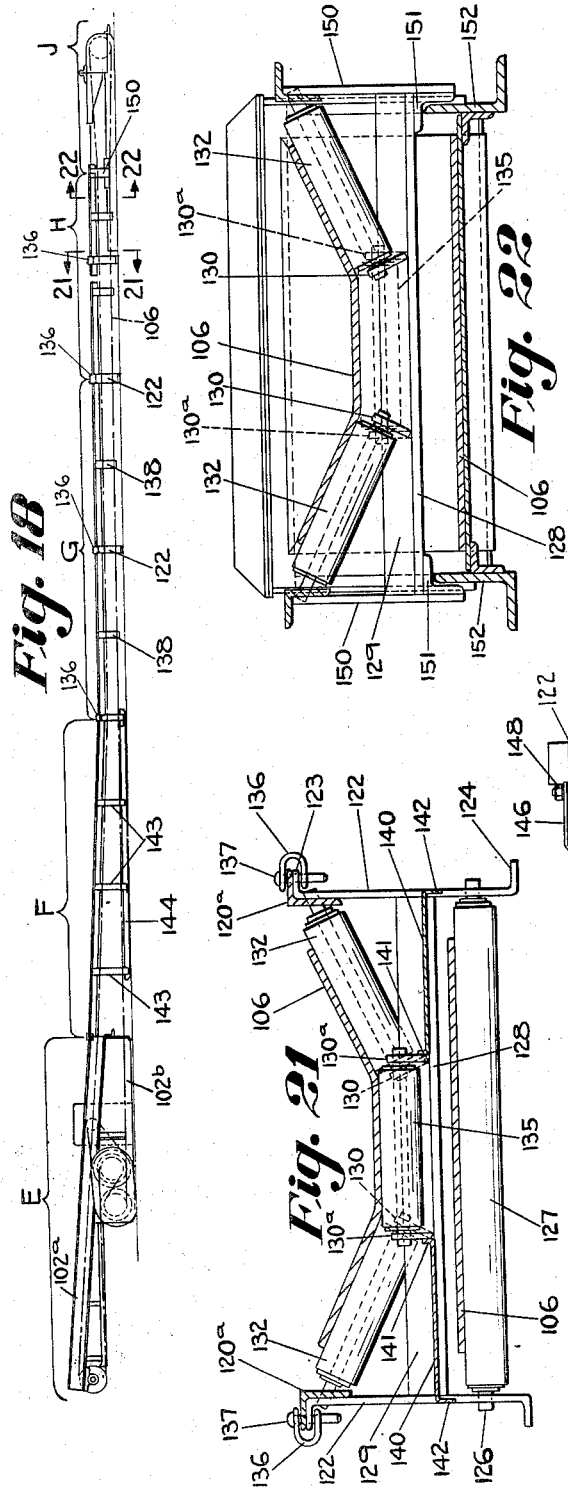
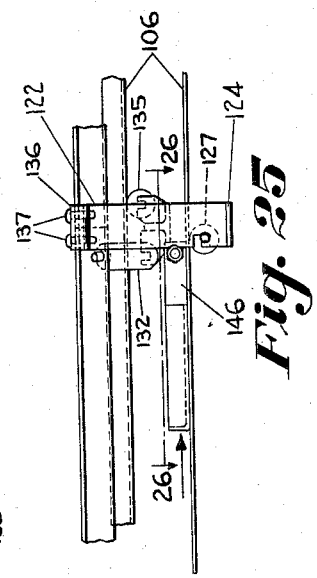
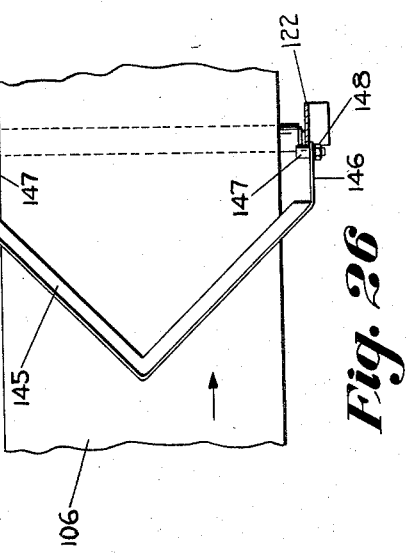
INVENTOR:
Nils D. Levin,
BY
Chas. M. Nissen,
ATT'Y.

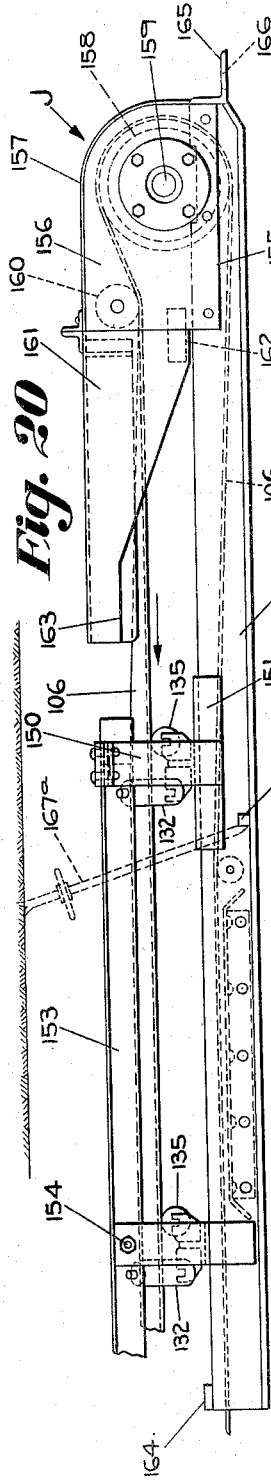

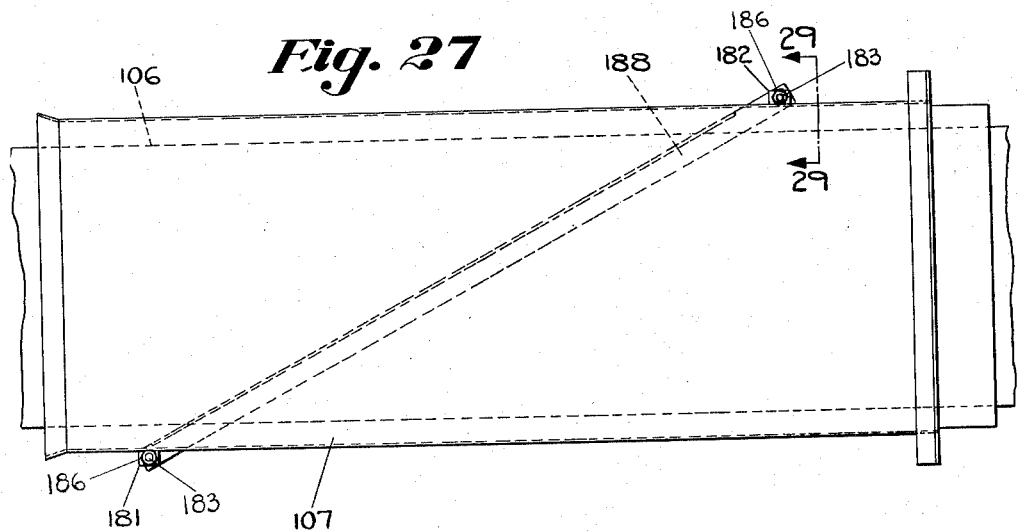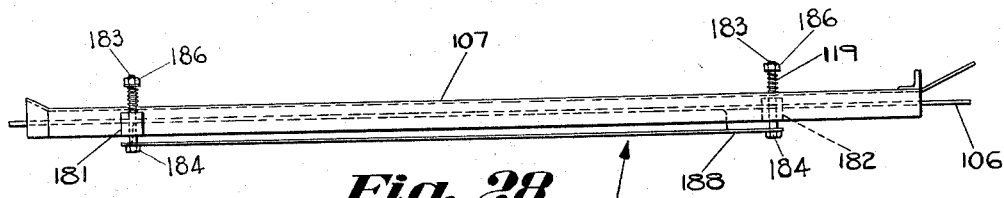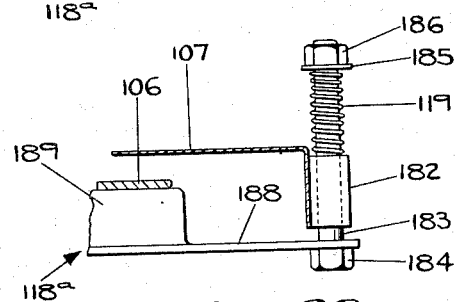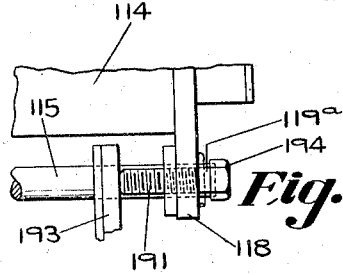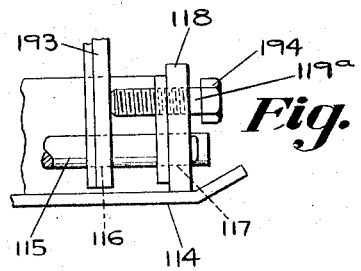

Patented Aug. 8, 1939

2,168,622

UNITED STATES PATENT OFFICE 2,168,622

MATERIAL HANDLING MECHANISM

Nils D. Levin, Columbus, Ohio, assignor to The Jeffrey Manufacturing Company, a corporation of Ohio Application April 6, 1933, Serial No. 664,780

8 Claims. (Cl. 198—204)

The material handling mechanism represented by the present invention is of the type of mechanism particularly designed to handle material, such as coal, for the transportation thereof from the location of the excavations to suitable conveyances, such as mine cars or the like; and while it will be understood that the apparatus is not, in any sense, restricted to use in mining operations, since it was designed especially for such purposes, it will be described in such connection.

Among the objects and advantages of the present invention may be mentioned, specifically, the provision of an extensible conveyor mechanism of the above indicated character which is very easily erected or assembled at the place of installation; which may be taken apart very easily and moved with facility to another place in the mine and then very quickly assembled; which has a drive section and an inclined section located where there is plenty of head room, but the extended parts of which are in low roofed places and very distant relatively; which has a power unit mounted on a separate skid, which may be easily changed from one side to the other; which is provided with a special intermediate tail end section and a tail end which telescopes into the special intermediate tail end section which arrangement enables the conveyor belt to be maintained at the proper tension; which provides at the drive end an alternative drive construction embracing storage space sufficient for adequate length of belt so that several intermediate sections of frame can be added before the addition of a new section of belt is required, which alternative construction is employed when the telescopic foot or tail arrangement is not used; which provides a belt which may be readily spliced with additional sections to meet the requirements of additional conveyor lengths; which incorporates reversible driving mechanism enabling reversal of direction of travel of the conveyor belt; which provides freely interchangeable supports or cross chairs for the frame structure; and of which each part of the structure is comparatively light, easily packed and very portable.

Other features and advantages of the present construction will become apparent as the description proceeds.

The invention will be more readily understood by reference to the accompanying drawings, in which:

Fig. 1 is a diagrammatic side elevation of one form of a conveyor constructed in accordance with the present invention;

Fig. 2 is an enlarged detail view, in elevation, of one side of the head, or drive, end of the conveyor of Fig. 1;

Fig. 3 is a section through the head end, taken on line 3—3 of Fig. 2, looking in the direction of the arrows;

Fig. 4 is a plan view of the mechanism of Fig. 3;

Fig. 5 is a diagrammatic side elevation of a fragment of adjacent sections of the conveyor frame, showing the manner of securing together adjacent ends of the frame sections;

Fig. 6 is a side elevation of the drive, or head, section of the conveyor, the view being taken on the opposite side from Fig. 2;

Fig. 7 is a view taken in section along the line 7—7 of Fig. 1 looking in the direction of the arrows;

Fig. 8 is a sectional end view of the conveyor drive mechanism as shown in Fig. 6, the conveyor and associated parts being omitted, the view being taken on line 8—8 of said Fig. 6 looking in the direction of the arrows and showing the mounting of the source of power;

Fig. 9 is a fragmentary side elevation of a portion of assembled units of the conveyor frame, showing the manner of assembling intermediate units;

Fig. 10 is a fragmentary side elevation showing the attachment of an intermediate drive end section adjoining the drive end;

Fig. 10a is a fragmentary elevation of the lower end of an auxiliary inclined section usable in connection with the head section;

Fig. 11 is a side view of the foot or tail section of the conveyor;

Fig. 12 is a sectional view on the line 12—12 of Fig. 11, looking in the direction of the arrows;

Fig. 13 is a sectional view on the line 13—13 of Fig. 2, also looking in the direction of the arrows;

Fig. 14 is a plan view of a locking or spacing plate employed for properly positioning the side frame members of the carriage of the drive section shown in Fig. 13;

Fig. 15 is a top view of an auxiliary plate employed in connection with the plate of Fig. 14;

Fig. 16 is a view of a fragment of conveyor belt, showing a splicing means for the belt for enabling the length of the belt to be increased with the addition of intermediate sections;

Fig. 17 is a perspective view of an intermediate section for a trough-shaped belt;

Fig. 17a is a view similar to Fig. 17 but showing a somewhat different form of intermediate section;

Fig. 18 is a view similar to Fig. 1, but showing a different form of frame adapted especially for use in connection with a trough-shaped conveyor;

Fig. 19 is a view similar to Fig. 2, but showing a different form of head, or drive, section suitable for use in connection with a trough-shaped conveyor, and showing, also, a resiliently mounted cleaning device for wiping the belt.

Fig. 20 is a side elevation of a tail, or foot, section of a somewhat different form from that illustrated in Fig. 11, and designed more especially for use in connection with a trough-shaped conveyor;

Fig. 21 is a sectional view taken on the line 21—21 of Fig. 18 looking in the direction of the arrows;

Fig. 22 is a sectional view taken along the line 22—22 of Fig. 18 looking in the direction of the arrows;

Fig. 23 is an end view, partially in section, showing the details of the mountings of the foot section pulley used in connection with the foot section of either Fig. 11 or Fig. 20;

Fig. 24 is a plan view of the modified head section;

Fig. 25 is a fragmentary side view showing the manner of mounting a cleaning element on the belt;

Fig. 26 is a plan view of the cleaning element, the view being taken on line 26—26 of Fig. 25;

Fig. 27 is a plan view of a part of the conveyor structure shown in Fig. 19, and showing the details of the arrangement of the cleaner relative to the belt;

Fig. 28 is a side elevation of the structure of Fig. 27;

Fig. 29 is a sectional view on the line 29—29 of Fig. 27;

Fig. 30 is a fragmentary plan view of a form of means provided for adjusting the tension of the conveyor drive belt;

Fig. 31 is a side elevation of the means illustrated in Fig. 30;

Fig. 32 is a somewhat fragmentary view indicating the manner of enclosing the tail section.

Referring more particularly to the drawings, the conveyor structure for a flat belt is illustrated in Fig. 1 as being made up of a head, or power section, or unit, A, an auxiliary head, or inclined section B, intermediate sections C, and a tail, or foot, section D. These sections are detachable one from another and can be assembled readily as desired, as will become clear hereinafter, to enable the length of the conveyor to be increased from room to room. The conveyor is shown to be an endless belt passing over the various pulleys and idler rollers mounted on the frame.

The head section A comprises a frame having top and bottom angle bars 1 and 2, disposed so that the flange 3 of bar 1 is at the top, and flange 4 of bar 2 is at the bottom of the head, or drive, on said head section A. These bars are duplicated on both sides of the machine. Vertical straps 5 carry the bars 1 and 2 and maintain them in proper spaced relation. Disposed below and spaced from the angle bars 1 and substantially parallel thereto are guide angle bars 6, carrying between them cooperating plates defining a carrier 7 in which is journalled the pulley 8. It will be seen that the bars 6 are angle bars, the flanges 9 of which are horizontally disposed, and that plates 7a of the carrier 7 are also provided with interiorly directed flanges 10.

Upon these flanges 10 rests the spacing for locking plate 11, and on this plate are placed supporting guides 12 and 12a. The flange 10, the locking or tie plate 11 and the supporting guide 12 are secured together by rivets 13. Guide 12a is provided with similarly extending lugs 12b, there being one of such lugs adjacent each end of the guide. A strip 12c is secured to the guide 12a intermediate these lugs 12b, and is spaced equally from each of the lugs, forming a space 12d therebetween. The strip 12c is secured to the guide 12a by rivets 13a. Vertically mounted upon the plates 7a are the plates 14 and suitably secured to the plates 14 are the angle members 15, the flanges 16 of which are disposed adjacent each other. Between these flanges is riveted, as indicated at 17, a spacer 18 to which is attached a cable 19 for pulling the carriage assembly along the guides 6. The angle bars 15 are secured to the plates 14 by cap screws 20. The purpose of the adjustment of the pulley 8 will become apparent hereinafter.

At the end of the head unit and on each side thereof, is a plate 21 in which are journalled pulleys 22 and 23, as will be apparent from the drawings. The exact shape of the plates 21 is not of particular importance nor is the exact location of the pulleys, these being relatively positioned so that a conveyor belt 24 may be passed around them and around pulley 8 in such a manner that adjustment of the position of pulley 8 will not be obstructed.

On one side of the head unit is mounted the power mechanism for driving the conveyor. This mechanism includes a motor 25, the armature shaft 25a of which is connected by a flexible coupling 26 to the high speed shaft 27a of the speed reducer 27. By means of the slow speed shaft 28 of the speed reducer 27, and a sprocket 29 fixed thereon, there is driven the sprocket chain 30. This chain passes over a sprocket 31 fixedly mounted on the head shaft 32, which shaft also carries fixedly thereto the head or drive pulley 23. The conveyor belt 24 is driven by this pulley 23.

It will be noted that the motor 25 and speed reducer 27 are mounted on a skid 33, having lugs 34 extending laterally from the ends of each side of the skid, these lugs being adapted to mate with corresponding lugs 35 extending laterally from the head end of the angle 2 at each side of the head section A. The lugs 34 and 35 are suitably apertured as indicated at 36, for receiving securing rods 37, or other securing members, secured in place by cotter pins as indicated at 38. Adjusting screws 36a move the skid lengthwise to tension chain 30 properly. The power mechanism may therefore be applied to either side of the head section, as the convenience of operating conditions may determine. It will be understood incidentally that the head shaft 32 may be reversed according to the position of the driving mechanism, the bearings 39 of the shaft being mounted through side plates 21 and held removably in position by bolts 40. Similar arrangements are provided for mounting the remaining shafts and pulleys, whereby they may be rendered dismountable when desired.

Further considering the details of construction as applied to the drive, or head, section, it has been said that the pulley 8 is adjusted by actuation of cable 19, which is wound on drum 41 fixedly mounted on shaft 42, bearing in vertical straps 42a. To maintain the pulley 8 in proper adjusted position, there is also fixed on the shaft 42 a ratchet 43, the teeth of which are adapted to interlock with pawl 44 to prevent accidental release of the drum 41. For actuating the shaft 42 and consequently drum 41 and ratchet 43, the shaft is provided with a square end 45 for receiving a socket wrench or other tool for turning the shaft. Movement of the carriage 7 along guides 6 is limited at one end by the drum 41 and at the other end by stop 46.

To the head section may be detachably secured an auxiliary head or inclined section B, which is used to connect the head section with the remainder of the conveyor which is usually of less height than the head section. The construction of the frame of the section B, together with the interconnecting means for connecting this frame with the frames of adjacent sections, is, in general, very similar to the construction of the frames of the remaining intermediate sections.

Referring in more detail to auxiliary section B, it will be seen that it embraces longitudinal angle bars 47 and 48 corresponding, respectively, to angle bars 1 and 2 of head section A. There is also a plate 49a (Figs. 10 and 10a) serving as cover plate, which corresponds to cover plate 49 of head section A. Longitudinal angle bars 47 and 48 are held in proper spaced relation by vertical straps, two of which are shown at 47a. The straps 47a are riveted to the angles 47 and 48, the latter of which is formed into a skid as is also the bottom flange 4 of bar 2 of section A. The frame A and the frame B are connected together by U-shaped connectors or clevises 53, as shown in Figs. 2 and 10, the frame parts and connections being provided with registering holes for the reception of pins 54 by which these parts are connected together. These connections 54 also serve as means for removably tying together the frames of adjacent sections in end to end relationship.

It will be observed that the vertical straps interconnecting the frame parts may be apertured to receive the idler rollers for the conveyor belt, which are adapted to be readily removed from their mountings. These apertures may be bayonet-shaped, as indicated at 55, extending inwardly from the edge of the strap and then downwardly in a vertical direction, or, as is indicated at 56, they may be in the shape of a key-hole with the enlarged part large enough to accommodate the passage of the roller therethrough, the notch 57 serving as a seat for the end of the axle of the roller.

These idler rollers are indicated generally at 59 and 60, the upper rollers 59 serving to support the conveyor belt 24 at required intervals, and the lower rollers 60 serving to support the belt on the return thereof. Each roller has an axle 61 with flattened ends 62 for seating in the respective notches and for interlocking therewith, the rollers turning while the axles remain stationary.

In the inclined unit B and the head unit A, the vertical straps are riveted to the upper and lower angle bars, as indicated at 63 (Fig. 10), whereas in the continuing intermediate sections C the straps are parts of chairs which are readily demountable and interchangeable.

In view of the fact that the straps support the idler rollers, they are arranged opposite one another along both sides of the frame.

Attention is now directed to Figs. 5, 7 and 9 and to the independently removable chairs for the intermediate sections C. These chairs are formed by opposing straps permanently united by a T-shaped bar 64 disposed with its web 65 upstanding, and welded to the straps along the flanges and web of the bar. Intermediate the ends of the bar are upstanding lugs 66 against which lugs are braced the removable shield plates 67, which are conveniently substantially Z-shaped, the flange 68 of each extending upwardly, and bearing against the lugs 66, the other flange 69 extending downwardly and abutting the straps 50 to prevent displacement. These plates are made in sections of suitable length to extend the whole length of the conveyor, and they serve to protect the return belt from material dropping over the edge of the carrying strand on to it, either because of overloading of the belt, or at points where other conveyors discharge onto the belt. Wherever necessary, pipe braces 70 may be provided for further stiffening the straps.

Passing now to the consideration of the intermediate sections C supported by the above described chair, one of which sections is illustrated in Fig. 9, it will be seen that such sections are generally similar to the construction just described except the omission of the lower longitudinal angle bars. Each intermediate section includes a pair of angle side rails 71, a support or cross chair, a pair of shield plates, a pair of U-connectors 53, and pair of pins 54. The cross chairs as shown in Figs. 5 and 7 include a pair of straps 50 with the connecting inverted T-shaped bar 64 therebetween. A cross chair at each end of the section supports the conveyor frame at 52, the straps 50 being provided, at their upper ends, with an outwardly directed flange 51 to which the angle bars 47 and clevises 53 are secured by the pins 54, which are dropped loosely into place. The cross chair carries the return idler 60 as well as top idler rollers 59; intermediate cross chairs, if desired, between the center and each end of the section, may carry advancing idlers only, and may not extend to the floor but be supported from the angle rails by bolts and nuts; and the plates 67 laid on the cross chairs and extending from one cross chair to the next to protect the return belt from spillage, all previously described.

The entire section is of knock-down construction and is assembled and disassembled into its component parts without the use of tools except for a wrench required to tighten and loosen the nuts that hold the intermediate cross chairs to the angle rails. The rollers are lifted in and out of their supports in the chair and the plates 67 may be lifted out.

Additional intermediate sections may be inserted to increase the length of the conveyor as needed. The individual parts are light in weight and easily handled, so that the lengthening or shortening of the conveyor may be easily accomplished.

Considering next in order the tail or foot section D, this section is attached to the last intermediate section to complete the conveyor. This section is attached in a manner similar to the sections previously described. This tail section, indicated at D, embraces the top and bottom angle bars 71 and 72, joined by the vertical straps 73 and end plates 74. The bars 72 are formed into skids 75 which are bent up as at 76, at the end of the section which is provided with pull connections 77. The end of the tail section is open beneath the end plate 71a which forms an end cover for the section. The tail section, being the section subjected to most manipulation since it is the part most often removed incident to the addition and withdrawal of standard intermediate sections as the conveyor is lengthened or shortened, and for facilitating the attachment and withdrawal of the section, is secured in place by the pins 78 which are slipped into the connecting clevis plate and which are somewhat more conveniently handled than the bolts or rivets previously described. The pins 78 have their ends 79 somewhat pointed to facilitate their insertion into the connecting clevis 53.

The conveyor belt passes over the tail pulley 80 carried on axle 81 mounted in plates 74. Side plates 82 suitably supported on bottom angles 72 are apertured at 83 to receive a V-shaped scraper 84 for cleaning the pulley side of the belt. This scraper is mounted so as to bridge across these apertures in engagement with the belt.

To protect the belt from accumulations of material at the sides of the conveyor, hinged cover plates 85 are provided which complete a closure for the rear end of the conveyor. These cover plates are hinged at 86 to bars 87 secured to the angles 71 by bolts or equivalent fastening members 88. Access to the conveyor belt may therefore be had whereby material accumulating under the belt may be cleaned out. In order to prevent the material being conveyed from falling between the conveyor belt and frame, lateral baffle plates 89 may be provided for guiding the material during loading thereof onto the conveyor belt; and a supporting plate 90 under the conveyor belt supports the belt during loading. Manipulation of the section D is accomplished in any suitable manner, as by connecting a cable to the connection 77 and then passing the said cable around an enclosed drum or the like by which a pull may be exerted on the cable to move the section. The baffle plates above referred to are provided at each loading point along the conveyor. These baffle plates are fitted with clamps similar to the clevis connections 53 which provide a quick and convenient means of fastening the plates to the side angles. In order to prevent spillage, the plate opposite the loading side is the higher of the two.

In view of the fact that the conveyor is of varying lengths, as explained herein, it is clear why the adjustable pulley 8 is provided at the drive end of the mechanism, as it is through this provision, together with means 91 on the belt enabling the belt to be spliced, that the length of the belt may be adjusted and maintained at proper tension. It will be apparent from the drawings that as the pulley 8 moves to the left towards stop 46, the belt 24 is lengthened, whereas when the pulley moves to the right towards the drum 41, the conveyor belt will be shortened. Storage space is therefore provided for the belt by virtue of the adjustable pulley 8. To more specifically illustrate, in practice it is found convenient to provide storage space for twenty-four feet of belt in the drive end of the conveyor. By this means, when the belt in storage has been payed out by adding new sections to the frame and when again after it becomes necessary to add a four-foot section of frame, a length of belt thirty-two feet can be spliced in. This allows eight feet for the new section and twenty-four feet of belt storage. Four sections can therefore be added for each length of belt spliced.

Fig. 13 shows a sectional detail of the movable carriage 7 and mounting of pulley 8. It will be seen that the pulley is mounted on an axle 92, the ends 93 of which are mounted in bushings 94 carried in the plates 7a of the carriage 7. The bushings 94 are provided with annular, inwardly projecting flanges 95 forming a track along which the end members 96 of the pulley rotate. These end members 96 form closures for the bearing housings of the pulley, each of which housings include the bearing race 97 in which are positioned ball bearings 98. The end parts 99 of the pulley are integral with the cylindrical surface thereof, and each bearing race is carried in an annular cup-like recess defined in the respective parts 99. The axle 92, as will be seen, is made of varying diameters as the ends of the axle are approached, in order to accommodate the various parts just now described.

In order to facilitate assembling of this roller construction, the lock plate 11 is shaped as in Fig. 14, with lugs 100 extending therefrom and the part of the plate 101 between the lugs is cut back as shown, this shape enabling, therefore, the insertion of the pulley in the carriage 7.

It will be seen that, when assembled, the lock plate 11 engages the guide 12a in such a manner that the lugs 100 fit into the spaces 12d between the lugs 12b on the guide 12a and the strip 12c.

For adjusting the pulley 8 so that it will run true with the conveyor belt, there is provided an adjusting screw 102 at each side of the carriage 7, for centering the roller relatively to the conveyor. There may be provided suitable instrumentalities, not shown, for keeping the surface of the pulley 8 free from deposited material.

The length of the conveyor belt sections may be made in accordance with individual requirements. For example, as illustrative, one section is desirably 107 ft. long to take care of the tail section D, the auxiliary head section B and the drive end A with sufficient belt storage for extending the conveyor twelve feet. A thirty-two foot length of belt is required to add a conveyor section four feet long and provide for twenty-four feet of belt storage; three additional sections can then be added before it would be necessary to splice again. Or, if desired, three sections could be made thirty-two feet long and the remainder sixty-four feet long. After three of the sections thirty-two feet long have been spliced in, they can be taken out when it becomes necessary to make the next splice, and two lengths of sixty-four feet spliced in to provide for the next sixteen feet of conveyor extension. A similar procedure could be followed with two thirty-two foot sections, or even one thirty-two foot section, alternately substituting a sixty-four foot section for the thirty-two foot section; or two thirty-two foot sections may be used with the remainder of the belt in ninety-six foot sections, substituting a ninety-six foot section for two thirty-two foot sections every time the belt is lengthened.

Where the machine is to be used for mining operations, as for instance in coal mines, as underground conditions do not permit usually of some of the refinements in loading the belt that are made use of in surface installations of a more permanent character, the conveyor belt itself should be covered with a high grade rubber that is tough and does not easily cut or tear. Experience has shown that for fully adequate security of fasteners where the belt is spliced, and for adequate stiffeners between supporting idlers, not less than a six-ply belt should be used, which is desirably of twenty-eight ounce or thirty-two ounce duck. For conveyor lengths over eight hundred feet the use of thirty-two ounce duck is desirable, and for conveyor lengths over one thousand feet, if the belt is loaded to capacity, eight-ply should be used. If the conveyor is not heavily loaded, a six-ply belt of thirty-two ounce duck may be used up to a conveyor length of fifteen hundred feet.

As to top cover, it is preferably to use a thickness of ⅜ inch, and the use of less than ⅛ inch thickness is not advisable. While conveyor belting usually has 3/32 inch bottom cover it has been found desirable, in practice, for underground conveyors to specify the same thickness of cover for top and bottom because in this service the belt suffers mostly from surface wear and the additional life to be had fully justifies the additional bottom cover. Furthermore, having both sides alike obviates the necessity of determining which is the top side each time a section of belt is added.

While the construction heretofore described is generally applicable to either a flat or trough conveyor, and the principles of construction of the parts are adaptable equally to either use, in practice the construction heretofore described is principally intended for use in connection with a flat conveyor belt; and for a trough conveyor the details of the structure must be somewhat modified.

In Figs. 17 to 31 inclusive there are shown certain of these different details.

Fig. 18 shows a complete conveyor, in a rather diagrammatic manner, which employs a troughed conveyor belt, and which is adapted for long-wall conveying operations. The view is generally similar to Fig. 1.

In common with the previously described form of apparatus, the conveyor structure in the form adapted to employ a trough-shaped conveyor belt embraces a plurality of separable sections, such, for example, as a driving, or head section, E, a special intermediate drive end section F adapted to be connected with the head section E, and forming an incline leading from what might be called the operative height of the conveyor to the head section E, at least one standard intermediate section G, which joins with a special intermediate tail end section H and a foot or tail end section J.

Referring first to the drive or head section E, illustrated in Fig. 19, it will be observed that the details are substantially different from the structural details of the head section previously set forth. In this changed form, it will be seen that the section includes the top channel frame bars 102a, shown as sloping upwardly to the discharge pulley 103, which rotates on axle 104 journalled in suitable end bearings 105. The conveyor belt 106 passes around this pulley 103 and discharges conveyed material thereover. There is also provided a shield plate or belt guard 107, below which the conveyor belt travels to tandem drive pulleys 108 and 109, mounted in an obvious manner, on the frame of the section, around which the belt passes. These tandem drive pulleys located below and back of the head pulley 103, insure adequate traction on the belt by providing a large arc of contact between the belt and the drive pulleys. These pulleys, as is also the head pulley 103, are slightly crowned to help keep the belt running true.

The drive pulleys are driven from a driving sprocket 110 through chain 111, this sprocket being driven by a standard type of speed reducer 112 which is operated in turn by a standard motor 113, of suitable horse power. This power unit, comprising the motor and speed reducer, is mounted on a separate skid 114, and can be easily changed to the opposite side of the conveyor. Suitable instrumentalities are provided for holding the skid and frame together and in line, such instrumentalities may be, for example, a long rod 115 passing through holes 116 in the conveyor frame and 117 in the skid lugs 118. This construction is similar to that shown in Figs. 6 and 8. An adjusting screw 119a (Figs. 30 and 31) is provided to move the skid 114 lengthwise and keep proper tension on the chain 111. Sprockets 110 and 115a, the latter driving the drive pulleys by engagement of chain 111 therewith, are protected by a suitable housing 116a.

The belt guard 107 is partially supported by and held in proper spaced relation from frame channels 102 by vertical interconnecting straps 117a on each side of head frame E. The bottom angles 102b of the head section E are interconnected with channels 102a by side plates 109a, in which the tandem drive pulleys are mounted.

It will be seen that in this form of head section there is no belt take up means, as are shown in Fig. 2 and described in the type of head section A set forth above, take up means being provided in the foot or tail section J presently to be described in detail, and which is intended to be used primarily in connection with this head section E just now described.

The speed reducer 112 of the power unit is a single reduction worm gear speed reducer which has its slow speed shaft 112a extended on both sides so that the drive may easily be changed to the opposite hand.

The sprocket 115a and the drive pulley 109 are keyed to the rear drive shaft 109b and the drive pulley 108 is keyed to the front drive shaft 108a. These drive shafts are geared together as indicated at 120 on the opposite side of the conveyor from the chain drive.

Passing next to the consideration of the special intermediate drive end section F and the standard intermediate section G, these will be described together in view of the similarity of construction, and with particular reference to the standard intermediate section. This section takes the conveyor along the working face where the operations are taking place, additional sections being added or removed as required to vary the length of the conveyor in conformity with the requirements of the operating conditions. The auxiliary head section F conveys the material from the level of the standard intermediate sections up to the level of the head section from which the material is discharged; but apart from the inclination of the frame, auxiliary head section F is similar to the intermediate section G.

Referring then to Fig. 17, which shows in perspective such an intermediate section, it will be seen that the section includes side angle bars 120a, straps 122 secured to the inverted T bars 128 having the vertical web 129. The section is completed by shield plates 140, supported on the T bars 128. Adjacent sections are united by U-shaped clevis plates 136, which secure the straps 122 to the side angle bars 120a through the provision of pins 137 passed through suitable openings provided for the purpose. The bottom and top ends of each strap are flanged outwardly as indicated at 123 and 124, the former fitting into the clevis plates 136 and the latter forming feet or supports for the section. At a desired distance above the feet 124, open sockets 125 are provided for the reception of the ends of the axles 126 of the return idler rollers 127.

As has been mentioned above, the straps 122 are braced by having suitably welded thereto the inverted T bar 128 provided with the upstanding web 129. Supports or brackets 130 and 130a are welded to the bars 128 intermediate the ends of the bars and spaced apart at a suitable distance. It will be noted that the brackets 130 and 130a are substantially duplicated on opposite sides of the web 129. The brackets 130 are notched at 131 to provide seats for one end of the axles 133 of the troughing idlers 132. The other end of axles 133 is seated in a suitable aperture 121 in the side rails or bars 120a. The troughing idlers are thereby supported at the proper angle of inclination to suitably shape the conveyor belt.

The intermediate idlers 135 are supported by having the ends of the axles thereof mounted in notches 134 of the brackets 130a, these brackets being straight instead of the inwardly converging shape of brackets 130.

It will be observed that the pairs of straps 122 together with their connecting T bar 128 form cross chairs located at desired intervals along the section. Specifically, there is such a cross chair at each end of the section that supports the conveyor frame and carries the return idler, as well as the troughing idler. Where the sections are joined, U-shaped clevises 136 secure the sections together, as well as the side rails and cross chairs, the securing being accomplished by pins or the like 137 inserted through registering holes provided for the purpose.

As indicated at 138, certain of the cross chairs, conveniently alternate ones, may not extend all the way to the floor. In such instances, the return idlers are usually omitted. These cross chairs further distinguish from those reaching to the floor in that the latter are usually secured to the side rails with a bolt and nut at each side, as indicated at 139. These details are largely optional, however, and obviously may be changed as desired to meet requirements of any individual installation.

For protecting the return conveyor belt from spillage of material from the belt above it, plates 140 are laid on the cross chairs and extend from one cross chair to the next. The entire section is assembled and disassembled into its component parts without the use of tools, except a wrench to loosen the nuts at 139 in the event that these be employed on the intermediate cross chairs instead of the clevis plates. The rollers are lifted in and out of their supports in the chair and the plates 140 may also be lifted out.

The various parts are of light weight, making very easy the lengthening or shortening of the conveyor.

Plates, such as 140, are employed through the entire length of the conveyor for protecting the return belt. Each plate has a flange 141 turned up on the inside, and a second flange 142 turned down on the outside edge for reinforcing the plate.

It has been mentioned that the special intermediate drive end section is similar in construction to the standard intermediate section above described. For this reason, a detailed showing and description thereof are deemed to be not necessary. It may be mentioned, however, that the supports 143 all extend substantially to the floor and are secured to the skid rail 144. These supports progressively lengthen toward the head section of the conveyor, there being troughing and return idler rollers at required intervals, the rollers being mounted in the same manner as described above.

At any convenient point along the return belt and abutting one of the cross chairs is a V-shaped scraper or cleaner for the return belt, which scraper is illustrated in Figs. 25 and 26.

In the illustrated form, the scraper is shown as having a V-shaped scraping blade 145, extending across the conveyor belt. To the ends of the blade are attached arms 146 through which are passed lugs 147 held in place by nuts 148. The conveyor belt, traveling in the direction of the arrows in Figs. 25 and 26, keeps the lugs 147 pressed against the vertical straps of the adjacent cross chair. In this manner the return belt is thoroughly cleaned of adhering material before it reaches the terminal pulley in the tail section J.

Between the standard intermediate section G and the tail section J, there is inserted a special intermediate tail end section H. This section differs from the intermediate section G in that the end cross chair 150 terminates short of the floor and is provided with angle guide supports 151 which rest upon the bottom angles 152 of the tail section J, which section is telescopically mounted relative to section H. The troughing idlers are mounted on the cross chair 150 in a manner analogous to that previously described. This telescopic arrangement provides means by which tension in the belt is adjusted, and the guides 151 serve as a slidable connection between the tail section J and the remainder of the conveyor. Section H is completed by the frame angles 153 being bolted, as at 154, to the cross chairs.

To complete the description of the tail section J the bottom angles 152 have bolted or otherwise secured thereto the housing 155, which includes side plates 156 and cover 157, which extends over the end of the section and houses the tail pulley 158, the axle 159 of which is suitably journalled in side plates 156. Also mounted between these plates 156 is a snub pulley 160, beneath which the conveyor belt is guided as it passes over the tail pulley 158.

To assure proper loading of the conveyor belt, baffle plates 161 are provided, these being secured to brackets 162 bolted or otherwise secured to plates 156. These baffle plates extend over the side of the conveyor section, as indicated, and slope over the edges of the belt as indicated at 163 to provide a kind of loading hopper and to guide material onto the center of the belt.

In practice, an adjustment of about five feet in the length of the conveyor or ten feet of belt may be obtained with this telescopic tail end section to keep the conveyor belt at the proper tension. A stop 164 prevents the telescopic parts from being pulled beyond their adjusting range.

Angle 165 at the extreme end of the tail section enables the section to be attached to a chain on a pulling jack or post puller. For this purpose, angle 165 is provided with holes 166, desirably three in number. By anchoring the usual chain on the other end of the pulling jack by means of a jack pipe, the tail section J may be pulled back and held by a ratchet between the two chains. This is a well understood provision, and requires no further description or illustration. A lug 167 is provided for engaging to a jack post 167a or the like for preventing the tail section moving in the opposite direction.

The tail pulley 80 or the tail pulley 158 is mounted as illustrated in Fig. 23. Bolted, as at 75

168, to each of the side plates 156 is a bearing cap 169 for receiving the end 170 of the pulley axle. The diameter of the axle is increased as indicated at 171 for wiping engagement with end gudgeon 172 of the roller. The axle again increases in diameter, as shown at 173 for the reception of a ball-bearing having an outer race 174 in which are positioned the ball bearings 175, said race 174 being mounted in a housing formed by a cup 176 and gudgeon 172. The ball-bearing also has an inner race which is held in position by engagement with the shoulder formed by a further enlargement of the axle 177.

If desired, the cover 157 may terminate short of the bottom of the pulley 158, as indicated at 178, for giving access to the belt indicated at 179, as the belt passes over the pulley 158. There may be secured to the cover 157 an angle 180 to provide attaching means for coupling to pulling instrumentalities for adjusting the tail section.

The pulley 158 is crowned to help keep the conveyor belt running true.

Referring to the detailed showing of Figs. 27, 28 and 29, it will be observed that these views illustrate the mounting of the wiping element 118a employed for cleaning the belt 106 before it passes over the drive pulleys 108 and 109.

From these figures, it will be seen that the guard plate 107 is provided with lugs 181 and 182, positioned one on each side of the plate. These lugs are welded to each side of the plate, and are provided with holes extending through them, for the reception of bolts 183, which are provided with heads 184, washers 185, and nuts 186. A spring 119 positioned between each of the lugs and washers 185 forms a resilient mounting for the bolt 183. The wiping element is suspended between these bolts 183, and is shown as comprising an angle member 188, the upstanding wiping flange 189 of which engages the pulley face of belt 106. The engagement between the belt 106 and wiping flange 189 is controlled by the adjustment of nuts 186. It is also to be noted that member 188 makes an acute angle with the axis of travel of belt 106.

During operation of the conveyor, it may become necessary to adjust the tension of the drive chain 111. This is accomplished by suitably moving the skid 114, carrying the motor 113 and associated drive mechanism. This is accomplished by means of the adjusting screws 119a threaded, as indicated at 191, through a lug 118 of the skid 114. The screw 119a bears against offstanding arm 193 of the frame of the head section of the conveyor. The screw has a head 194 by means of which the screw may be adjusted to move the skid relative to the conveyor frame as will be very apparent from the drawings, thus correspondingly adjusting the tension of the drive chain or belt 111.

It will be understood from the foregoing description that the head, or drive, end of the conveyor is anchored to the floor by its weight. The supporting frames or cross chairs are H-shaped, and from the drive end to the first frame or cross chair are run two angle bars which hold the frame upright. The lower end of the frame is held by its contact with the floor, all the frames being similarly held; i. e. they are held upright by the angles that run from one to another and are finally connected to the head end. It will be understood, also, that the connections between the angle irons and the H-shaped frames are not rigid, but are loose, so that the frames can be moved at will for lining up the belt, and the loose connections allow the conveyor to conform to the irregularities of the floor.

As has been previously indicated in this description, the tail, or foot, section may be anchored to a jack between the roof and floor, through the instrumentalities of a block and tackle attached to the jack and to the foot section. Such anchoring provisions are shown in Fig. 32, where the foot section J is shown as anchored to a jack 195 by a block and tackle 196 secured by a hook 197 inserted in one of the openings 166 of the foot angle 165. A chain or similar device 198 connects the block and tackle to the jack, the latter being shown positioned between the roof 199 and floor 200.

All rollers throughout the conveyor structure are mounted on anti-friction bearings, and suitable connections for attachment of pressure lubricating devices are provided for each roller, in a well understood manner.

Obviously those skilled in the art may make various changes in the details and arrangement of parts without departing from the spirit and scope of the invention as defined by the claims hereto appended, and I wish therefore not to be restricted to the precise construction herein disclosed.

Having thus described and shown an embodiment of my invention, what I desire to secure by Letters Patent of the United States is:

1. Conveyor apparatus comprising head and foot sections and at least one intermediate section, and cross-chairs for supporting the sections, the cross-chairs comprising opposing standards forming frame supporting members, an inverted T-shaped bar connecting the supporting standards, upstanding members on the bar, and substantially Z-shaped shield plates extending from one cross-chair to the next succeeding cross-chair, the shield plates having one flange braced by one of the upstanding members on the bar and the other flange engaging a corresponding supporting standard.

2. In a conveyor apparatus, the combination with a support having vertical spaced-apart standards and a horizontal connecting cross-piece therefor, upstanding abutments on said cross-piece and laterally-spaced spill plates with one end of each resting on said cross-piece and held between one of said abutments and one of said standards, said spill plates having downwardly-extending side flanges adjacent their outer edges and upwardly-extending flanges adjacent their inner edges.

3. In a conveyor having a plurality of sections, the combination with an H-shaped chair having U-shaped side plates and an inverted T-shaped cross-piece, said side plates being provided with L-shaped notches adapted to receive the ends of a roller, of a plurality of frames having L-shaped members contiguous ends of which are adapted to be attached to the upper legs of said side plates by U-shaped clevises the legs of which clamp said side plates and members together by pins, and Z-shaped spill plates the ends of which are supported on said cross-piece.

4. In a conveyor having a plurality of sections, the combination with a chair having side plates with flanges at the tops thereof, of a plurality of frames having rails the contiguous ends of which are adapted to be attached to said flanges, and U-shaped clevises adapted to clamp said flanges and rails together, said clevises, flanges and rails having registering pin holes, and retaining pins in said pin holes.

5. In a portable sectional conveyor, an endless conveyor belt, a belt-supporting structure comprising a main cradle including standards, cross-bars connecting said standards in pairs, and side rails detachably supported at their ends on said standards, a supplemental cradle including a cross-bar, means attaching the supplemental cradle and rails for suspending the supplemental cradle from the respective rails, and means for flexibly and detachably coupling the ends of the respective rails to the associated standards.

6. In a portable sectional conveyor, an endless belt, a belt supporting structure comprising a main cradle including standards, cross-bars connecting said standards in pairs, and side rails detachably supported on said standards, a supplemental cradle including a cross-bar, means attaching the supplemental cradle and rails for suspending the supplemental cradle from the respective rails, belt-supporting idlers on the cross-bars of the respective cradles, and means for flexibly and detachably coupling the ends of the respective rails to the associated standards.

7. In conveyor apparatus, the combination with a belt, of a supporting frame therefor comprising a plurality of transverse H-shaped supports each having uprights and a connecting cross-piece carrying a member, said supports being spaced-apart longitudinally of the conveyor apparatus, rails extending between and connecting said supports together, and a longitudinal spill plate with its ends supported by the cross-pieces of adjacent supports and removable while said rails remain in position, said spill plate having oppositely directed flanges along the lateral edges thereof, said spill plate being held against lateral movement by the uprights of said supports and said members on said support cross-pieces.

8. In conveyor apparatus, the combination with a belt, of a supporting frame therefor comprising a plurality of supporting chairs each formed by continuous side uprights and a connecting cross-piece, rails extending between said chairs, means removably connecting said rails and chairs together, idler rollers, means supporting said idler rollers by said frame including bracket means on said cross-pieces, removable spill plates supported by the cross-pieces, said spill plates being held against lateral movement by the uprights of said chairs and said bracket means on said cross-pieces.

NILS D. LEVIN.